United States Patent [19]

Mathis et al.

[11] 3,959,218

[45] May 25, 1976

[54] ULTRAVIOLET LIGHT STABILIZING SYSTEM

[75] Inventors: Ronald D. Mathis, Taylors; James S. Dix, Greenville, both of S.C.

[73] Assignee: Phillips Petroleum Company, Bartlesville, Okla.

[22] Filed: Jan. 19, 1973

[21] Appl. No.: 324,975

[52] U.S. Cl. ................. 260/45.75 N; 260/45.8 N; 260/45.85 B
[51] Int. Cl.² .......................................... C08J 3/20
[58] Field of Search ............ 260/45.75 N, 45.85 B, 260/45.95 R, 45.95 H, 45.8 N, 45.95 C, 45.95 G

[56] References Cited
UNITED STATES PATENTS

| | | | |
|---|---|---|---|
| 3,206,431 | 9/1965 | Doyle et al. | 260/45.75 |
| 3,285,855 | 11/1966 | Dexter et al. | 260/45.75 |
| 3,367,870 | 2/1968 | Spivack | 260/45.95 |
| 3,459,703 | 8/1969 | Briggs et al. | 260/45.75 |
| 3,531,483 | 9/1970 | Gilles | 260/45.8 |
| 3,646,110 | 2/1972 | Eggensperger | 260/45.85 |

*Primary Examiner*—V. P. Hoke

[57] ABSTRACT

Ultraviolet light stabilizers for polymers derived from unsaturated monomers comprising mixtures of hydroxy-substituted phenylbenzoates, nickel ketoximes and hindered phenols are described.

3 Claims, No Drawings

ULTRAVIOLET LIGHT STABILIZING SYSTEM

This invention relates to the ultraviolet light stabilization of synthetic polymers.

It is known that ultraviolet light has a deleterious effect on both the appearance and properties of synthetic polymers. For example, normally colorless or light-colored polyesters yellow on exposure to sunlight. Polystyrene discolors and cracks, with accompanying loss of its desirable physical properties when exposed to ultraviolet light, while vinyl resins, such as polymers of vinyl chloride and vinyl acetate, spot and degrade. The rate of oxidation of polyolefins such as polyethylene and polypropylene is materially accelerated by ultraviolet light.

Thus, moldings, monofilaments, multifilaments, fibers, sheets, films and other sections derived from such polymers have a very limited useful life in outdoor applications where exposure to sunlight and oxygen of the air occurs for prolonged periods of time. In such environments, such polymers degrade very rapidly, resulting in virtually complete loss of required mechanical properties such as tensile strength, elongation, tear strength and abrasion resistance.

While various additives have been employed in the past to overcome degradation of polymers exposed to sunlight, there has not yet been discovered an ideal stabilizer which can at once solve all problems of instability.

It is an object of this invention to provide a stabilizer system for synthetic polymers. Another object is to provide stabilized polymeric compositions.

These and other objects will be apparent to one skilled in the art from the following disclosure and the appended claims.

In accordance with this invention we have found that a stabilizer system comprising as a first component a hydroxy-substituted phenylbenzoate, as a second component a nickel ketoxime, and as a third component a hindered phenol, provides unexpectedly improved resistance to ultraviolet light radiation. An additional embodiment of this invention provides for ultraviolet light-stable polymer compositions containing the aforesaid first, second and third components. The present invention is particularly directed to stabilized polyolefins which have improved resistance to ultraviolet light radiation.

The hydroxy-substituted phenylbenzoates, that can be employed in the practice of this invention are compounds represented by the formula

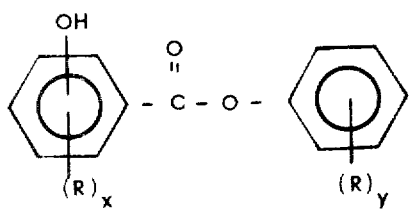

wherein each R group independently represents halogens, saturated acyclic radicals having up to 20 carbon atoms or saturated cyclic radicals having up to 20 carbon atoms, $x$ is an integer having a value of from 0 to 4, and $y$ is an integer having a value of from 0 to 4. Particularly preferred acyclic and cyclic radicals are aliphatic, alicyclic, aromatic hydrocarbyl or hydrocarbyloxy radicals and combinations thereof having up to 10 carbon atoms. Representative of hydroxy-substituted phenylbenzoates that can be employed are: phenyl 4-hydroxybenzoate; 2′,4′-di-t-butylphenyl 3,5-di-t-butyl-4-hydroxybenzoate; 2′,4′-dicyclooctylphenyl 3,5-dicyclooctyl-4-hydroxybenzoate; 2′,4′-dioctadecylphenyl 3,5-dipentadecyl-4-hydroxybenzoate; 2′,4′-di(2,2-dimethylpentyl)phenyl 3,5-di(2,2-dimethylpentyl)-4-hydroxybenzoate; 4′-octylphenyl 3,5-di-t-butyl-4-hydroxybenzoate; 3′,5′-dilaurylphenyl 3,5-di-t-octyl-4-hydroxybenzoate; 2′-t-butylphenyl 3,5-di(2,2-diethylbutyl)-4-hydroxybenzoate; 2′-chloro-4′-octylphenyl 3,5-di-t-butyl-4-hydroxybenzoate; p-bromophenyl 3,5-di-t-butyl-4-hydroxybenzoate; o-phenylphenyl 3,5-di-t-butyl-4-hydroxybenzoate; p-phenylphenyl 3,5-di-t-butyl-4-hydroxybenzoate; p-methoxyphenyl 3,5-di-t-butyl-4-hydroxybenzoate; phenyl 3,5-di-t-butyl-4-hydroxybenzoate; 4′-phenoxyphenyl 3,5-di-t-butyl-4-hydroxybenzoate; 4′-cyclopropoxyphenyl 3,5-di-octyl-4-hydroxybenzoate; 4′-octadecylphenyl 3,5-di-t-amyl-4-hydroxybenzoate; 4′-dodecylphenyl 2-n-decyl-4-hydroxybenzoate; p-octylphenyl salicylate; p-hexadecylphenyl salicylate and mixtures thereof.

The nickel ketoximes, that can be employed in the practice of this invention are nickel chelate complexes with an aromatic oxime of the formula

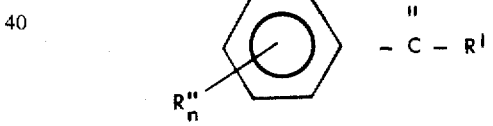

wherein R′ is an alkyl or alkenyl radical containing from 1 to 18 C atoms; phenyl, alpha- or beta-naphthyl, or a cycloalkyl radical of 5 to 8 C atoms. R″ is alkyl or alkoxy radical containing from 1 to 12 C atoms; halogen, hydroxyl, phenyl, nitro or a cycloalkyl containing from 5 to 8 C atoms; $n$ is an integer having a value of from 0 to 2. When $n$ is 2, R can be the same or different. Representative of nickel ketoximes that can be employed are:

nickel bis(syn-methyl-2-hydroxy-4-methylphenyl ketoxime)
nickel bis(syn-phenyl-2-hydroxy-5-chlorophenyl ketoxime)
nickel bis(syn-phenyl-2-hydroxy-4-heptoxyphenyl ketoxime)
nickel bis(syn-phenyl-2-hydroxy-naphthyl ketoxime)
nickel bis(syn-heptadecyl-2-hydroxy-4-methylphenyl ketoxime)
nickel bis(syn-phenyl-4-dodecyloxy-2-hydroxyphenyl ketoxime)

nickel bis(syn-methyl-2,4-dihydroxyphenyl ketoxime)
nickel bis(syn-octadec-9-enyl-2-hydroxy-4-methylphenyl ketoxime)
nickel bis(syn-methyl-2-hydroxy-5-nitrophenyl ketoxime)
nickel bis(syn-methyl-2-hydroxyphenyl ketoxime)
nickel bis(syn-methyl-2-hydroxy-4-cyclohexylphenyl ketoxime)

and the like. A presently preferred compound is nickel bis(syn-methyl-2-hydroxy-4-methylphenyl ketoxime).

The hindered phenols, that can be employed in the practice of this invention are those which have been found to exhibit good thermal stabilization. Representative of such hindered phenols that can be employed are:

octadecyl[3-(3,5-di-t-butyl-4-hydroxyphenyl)]propionate
tetrakis[methylene(3,5-di-t-butyl-4-hydroxyhydrocinnamate)]methane
2,6-di-t-butyl-4-methylphenol
di-n-octadecyl(3,5-di-t-butyl-4-hydroxybenzyl)phosphonate
1,3,5-trimethyl-2,4,6-tris(3,5-di-t-butyl-4-hydroxybenzyl) benzene, and
tris(3,5-di-t-butyl-4-hydroxybenzyl)isocyanurate.

The polymeric materials that can be employed in the practice of this invention are normally solid synthetic polymers derived from unsaturated monomers. Such polymeric materials include homopolymers, copolymers and blends of such polymers. Examples of suitable polymers are polymers of aliphatic 1-olefins (polyolefins); poly(vinyl-substituted aromatic compounds) such as polystyrene; poly(vinyl halides) such as poly(vinyl chloride); poly(vinyl acetate); and the like. Preferred polymers in the practice of this invention include homopolymers and copolymers derived from 1-monoolefins having from 2 to 8 carbon atoms. In most instances, the presently preferred polymers are ethylene or propylene homopolymers, or are copolymers of ethylene or propylene with minor amounts of monomers copolymerizable therewith such as propylene or ethylene, butene-1, hexene-1, octene-1, and the like.

The stabilizer components set out hereinbefore can be incorporated in the polymers in the practice of this invention in any suitable manner. The stabilizing combination should be incorporated in the polymer in an amount sufficient to afford the polymer the degree of ultraviolet light stabilization which is required. In general, each component is incorporated in individual amounts as shown below:

| Component | Amount, php* Broad | Preferred |
|---|---|---|
| 1 | 0.05 to 5 | 0.1 to 2 |
| 2 | 0.05 to 5 | 0.1 to 2 |
| 3 | 0.01 to 1 | 0.02 to 0.5 |

*parts per 100 parts of polymer

The ratio of component 1 to component 2, by weight, can vary from 10:1 to 1:10, preferably from 4:1 to 1:4. The ratio of the combination of components 1 and 2 to component 3, by weight, can vary from about 100:1 to about 2:1, preferably from about 25:1 to about 5:1.

In the preparation of the ultraviolet light-stabilized polymer compositions, suitable methods of preparation comprise admixing the components in conventional polymer process equipment for a sufficient period of time and at adequate temperatures to intimately combine polymer with the ultraviolet light-stabilizing system to obtain at least substantially uniform dispersion of the ultraviolet light-stabilizing components in the polymer. Suitable methods of incorporation include dry blending with polymer powders or pellets in tumble mixers, Henschel mixers, and the like. Alternatively, polymer and stabilizer components can be admixed in screw extruders, Banbury mixers, Brabender mixers, roll mills, and the like, in order to blend the stabilizers with molten polymer or polymer mixtures. Alternatively, the stabilizer components can be sprayed on the polymer powder from a solution or dispersion in acetone, methanol, cyclohexane, n-hexane, aromatic hydrocarbons such as benzene, and the like, prior to pelletizing of the polymeric compositions. In general, when a solvent is employed it is usually removed by evaporation prior to final processing of the polymeric compositions into its final form.

Other conventional additives can be incorporated into the compositions if desired. Such additives include dyes, pigments, fillers, anti-static agents, processing aids such as calcium stearate, and secondary stabilizers such as organic phosphites and thioesters exemplified by dilaurylthiodipropionate and the like.

The following examples will further illustrate the invention.

EXAMPLE I

Nickel bis(syn-methyl-2-hydroxy-4-methylphenylketoxime), hereinafter designated as "A", 2',4'-di-tert-butylphenyl 3,5-di-tert-butyl-4-hydroxybenzoate, hereinafter designated as "B", and octadecyl[3-(3,5-di-tert-butyl-4-hydroxyphenyl)]propionate, hereinafter designated as "C", were added individually or in combination to polypropylene having a nominal melt flow value of 3–4. In each evaluation, the same polypropylene was employed which, in combination with the additive added thereto for ultraviolet light stability, was formed into films having a thickness of 5 mils. Each polymer and additive combination was wet with n-hexane and mechanically blended after which it was further mixed by masticating in a Brabender Plastograph, at 200° C. for 5 minutes under a nitrogen atmosphere, then compression molded to form the film. Exposure was in an Atlas twin enclosed carbon arc Weather-O-Meter operated without the water-spray cycle and modified by the incorporation therein of eight fluorescent sun lamps. Samples were tested for failure every 20 hours by subjecting each film strip to a rolling motion such that the entire length of the film strip we bent approximately 180°. The samples failed when the film strips broke. The results of the test were as follows:

| Stabilizer | Amount, php* A | B | C | Hours to Failure |
|---|---|---|---|---|
| A+C | 0.5 | — | 0.05 | 393 |
| B+C | — | 0.5 | .05 | 487 |
| A+B+C | 0.15 | 0.35 | .05 | 733 |
| A+B+C | 0.25 | 0.25 | .05 | 667 |

*Parts of stabilizer by weight per 100 parts of polypropylene by weight.

EXAMPLE II

Nickel bis(syn-methyl-2-hydroxy-4-methylphenylketoxime), hereinafter designated as A, 2',4'-di-tert-butylphenyl 3,5-di-tert-butyl-4-hydroxybenzoate, hereinafter designated as B, and tris(3,5-di-tert-butyl-4-hydroxybenzyl)isocyanurate, hereinafter designated as "D", were added individually or in combination to polypropylene having a nominal melt flow value of about 12. In each evaluation the same polypropylene was employed, which in combination with the additive added thereto for ultraviolet light stability was spun into fibers. Fiber evaluation was conducted on about 4000 denier crimped tow (18 denier per filament) containing 0.96 weight percent (based upon the weight of polymer plus additives) Fast Red BR FPP pigment and 0.1 php calcium stearate. Exposure was in an Atlas twin enclosed carbon arc Weather-O-Meter operated without the water-spray cycle and modified by the incorporation therein of eight fluorescent sun lamps. Samples were tested for failure every 100 hours, starting at 140 hours, on an Instron tensile tester.

The following results were obtained:

| Stabilizer | Amount, php | | | Initial Tenacity (gpd)* | Hours to 1 gpd* |
|---|---|---|---|---|---|
| | A | B | D | | |
| A+D | 1.6 | — | 0.1 | 3.08 | 470 |
| B+D | — | 1.6 | 0.1 | 3.41 | 525 |
| A+B+D | 0.5 | 1.0 | 0.1 | 3.38 | 530 |

*grams per denier

As indicated in the examples, the ultraviolet light-stabilizing combination of a hydroxy-substituted phenylbenzoate, a nickel ketoxime and a hindered phenol of this invention produces a stabilized polymer composition having greater ultraviolet light stability than is afforded the polymeric composition when the combination is not present. In Example I wherein a constant amount of additive was employed the stabilizer combination of A+B+C afforded unexpectedly greater protection than was afforded when any one of the components of the combination was not present. In Example II, the protection afforded by the combination of A+B+D was greater than was afforded by larger amounts of A+D or B+D.

Further modifications and variations may be made by those skilled in the art without departing from the spirit and scope of the invention as defined herein and in the appended claims.

We claim:

1. An ultraviolet light stabilized polymeric composition which comprises a normally solid polypropylene and a stabilizer system which consists of:
   a. nickel bis(syn-methyl-2-hydroxy-4-methylphenylketoxime);
   b. 2',4'-di-tert-butylphenyl-3,5-di-tert-butyl-4-hydroxybenzoate; and
   c. octadecyl [3-(3,5-di-tert-butyl-4-hydroxyphenyl)]propionate; wherein said components (a), (b) and (c) are employed in amounts as follows: component (a), from 0.1 to 2 php, component (b), from 0.1 to 2 php and component (c), from 0.02 to 0.5 pnp; and wherein the weight ratio of (a) to (b) is in the range of 1:4 to 4:1 and the weight ratio of the combination of (a) and (b) to (c) is in the range of 25:1 to 5:1.

2. The composition of claim 1 wherein said mixture is present in said polypropylene in amounts of each component as follows: component (a), 0.15 php; component (b), 0.35 php; and component (c), 0.05 php.

3. The composition of claim 1 wherein said mixture is present in said polypropylene in amounts of each component as follows: component (a), 0.25 php, component (b), 0.25 php and component (c), 0.05 php.

* * * * *